March 28, 1944.　　B. B. SMITH ET AL　　2,345,361
CONTROL SYSTEM
Filed Oct. 20, 1942　　2 Sheets-Sheet 1

Inventors
E. E. HILKER AND
B. B. SMITH
BY
Malcolm J. Barnes
Attorney

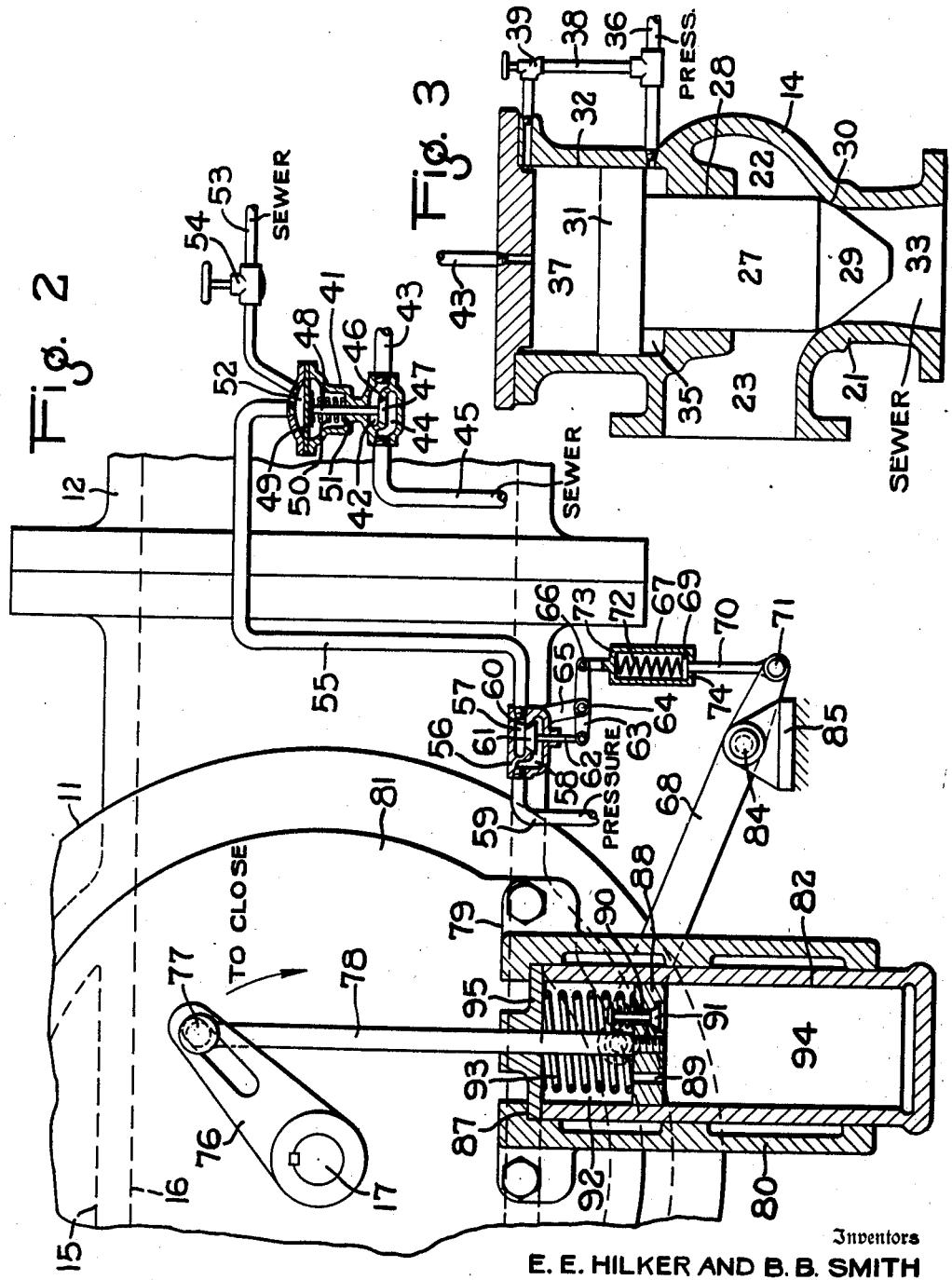

Patented Mar. 28, 1944

2,345,361

UNITED STATES PATENT OFFICE 2,345,361

CONTROL SYSTEM

Burwell B. Smith and Earl E. Hilker, York, Pa., assignors to S. Morgan Smith Company, York, Pa., a corporation of Pennsylvania Application October 20, 1942, Serial No. 462,684

5 Claims. (Cl. 137—78)

This invention relates to control systems, and more particularly to control systems for pipe lines of the type having a check valve on the discharge side of a pump.

In our application for Letters Patent which was filed in the United States Patent Office October 14, 1942, Serial No. 461,962, for Control system, there is shown and described a control system designed to protect the discharge line from a pumping station against excessive pressure rise caused by a rapid shut down of the pumping unit and a fast closure of the check valve.

In the control system of the above referred to pending patent application the check valve is adapted to be operated automatically according to variations in the pressure of fluid in the pipe line in such a manner that under normal conditions the valve operating mechanism is controlled so as to effect closing of the check valve at a relatively slow rate of speed, while during emergency or abnormal conditions the average time to close the check valve is many times faster than the normal closing rate.

Associated with the check valve of the above referred to pending patent application, is a relief valve which is connected by a vent pipe with the main pipe line and which has a valve element normally closed. Means are provided for operating the valve element of the relief valve, such means including a dash pot device normally movable at a slow rate of speed when the check valve is operated under predetermined normal conditions so as to prevent operation of the relief valve to open communication to vent fluid from the main pipe line, the dash pot device being adapted, when moved rapidly, to effect opening of the relief valve, so that when the check valve is moved towards closed position at a rapid rate of speed the relief valve will be opened and thereby prevent excessive pressure rises in the main pipe line resulting from the rapid closing of the check valve.

In the above referred to pending patent application the mechanism for controlling the operation of the relief valve is connected to the operating shaft of the plug of the check valve by a series of links and levers. In other words, the relief valve mechanism is directly connected to the operating mechanism of the check valve by mechanical means. The advantage of such mechanical hook up of the relief valve with the check valve is that, under some conditions of installation, it is necessary to arrange the relief valve in proximity to the check valve, and when such a close arrangement is made, it is of advantage to directly connect the relief valve mechanism to the check valve operating mechanism.

On the other hand, under some conditions of installation, it is not possible to locate the relief valve close to the check valve. When such conditions arise, it may be necessary to connect the relief valve to the main pipe line at a point remote to the check valve, and the present invention relates to such a control system in which the relief valve is disposed at a considerable distance from the check valve.

An object of the present invention is to provide an improved control system for a pipe line of the type having a check valve on the discharge side of a pump, in which a relief valve is connected to the pipe line at a point downstream with respect to the check valve, and in which there are improved mechanical and hydraulic means operatively connecting the relief valve with the check valve so that when the check valve is operated under certain conditions the relief valve will not be operated to discharge fluid from the pipe line, and when the check valve is operated under other conditions to cut off the flow of fluid in the pipe line the relief valve will be operated to discharge fluid from the pipe line on the downstream side of the check valve.

Another object of the invention is to provide an improved combined mechanical and hydraulic control system of the above type which is so arranged that the relief valve can be disposed at a point remote from the check valve.

With the foregoing and other objects and advantages in view, the invention consists in the preferred construction and arrangement of the several parts which will be hereinafter fully described and claimed.

In the accompanying drawings—

Fig. 1 is a diagrammatic view of a control system embodying the present invention;

Fig. 2 is an enlarged view of a portion of the structure shown in Fig. 1, parts being illustrated in section; and Fig. 3 is an enlarged vertical section of the relief valve shown in Fig. 1.

Referring to the drawings, and especially to Fig. 1, at a convenient point on the pressure side of a pump (not shown), the pipe line has installed therein an automatically operable check valve 11.

The check valve 11 may be of the type shown in the following United States Letters Patents, namely, #2,219,359, granted October 29, 1940, for Control system, invented by Laurence E. Goit and Eugene C. Brisbane; #2,220,327, granted November 5, 1940, for Control system, invented by Laurence E. Goit and Eugene C. Brisbane; and #2,232,901, granted February 25, 1941, for a Valve, invented by Eugene C. Brisbane.

Patents #2,219,359 and #2,220,327 each relate to a control system for the power operated mechanism of a valve installed in a pipe line on the pressure side of a motor driven pump, in which electromagnetically operated means are associated with the circuit supplying current to the pump motor so as to be responsive to line connection for said motor to control the operation of the valve mechanism.

In Patent #2,232,901, the check valve, which is located in the pipe line on the pressure side of a pump, has operating mechanism which is controlled in such a manner that, under normal conditions, the valve operating mechanism is controlled so as to effect closing of the valve plug in approximately forty seconds, while during closing operation of the valve plug under emergency or abnormal conditions, the average time to close the valve plug is approximately five seconds, or eight times faster than the normal closing rate.

When a valve is operated quickly to shut off communication through a pipe line, such as is described in Patent #2,232,901, an excessive pressure rise occurs in the pipe line on the downstream side of the valve. Since this excessive rise in fluid pressure is detrimental and often causes fracture or breaks in the pipe line, it is of advantage to provide some means for preventing the occurrence of these excessive increases in the pressure of the fluid.

According to the present invention, at some convenient point in the pipe line 12 on the downstream side of the check valve 11, a vent pipe 13 is connected to the pipe 12.

A relief valve 14 is connected to the outer end of the vent pipe 13.

The valve 11 may be of the type referred to in the above mentioned patents, and has a valve plug or gate 15 which is formed with a waterway 16 adapted to register with the bore of the pipe 12 when the plug is in the open position shown.

The plug or gate 15 is adapted to be rotated by suitable mechanism, as described in either one of the three patents above referred to, which mechanism is not shown or described herein, since it is well known in the art. However, as a part of the valve operating mechanism, the plug 15 has a shaft 17 which extends beyond the valve casing a suitable distance, as shown in Patents #2,219,359 and #2,220,327.

The relief valve 14 comprises an elbow type of valve having a casing 21 formed with a chamber 22, which is connected by a passage 23 to the vent pipe 13 leading from the main pipe 12, so that said chamber 22 is always in communication with said main pipe, and fluid under pressure in the main pipe 12 is always present in valve chamber 22.

A piston valve 27 is mounted in a bore 28 formed in the body of the relief valve 14.

The piston valve 27 comprises a main body portion, which at one end is formed with a tapered portion 29 adapted to engage a seat 30 formed in the casing 21.

The end of the piston valve 27 opposite to the tapered portion 29 is formed with a head or piston 31 which is mounted in a cylinder 32.

The piston valve 27 is adapted to control communication from chamber 22 to a passage 33 adapted to be connected to a free discharge or sewer. If so desired the free discharge to which passage 33 is adapted to be connected may be the suction well of the pump (not shown), as is well known in the art.

The valve seat 30 is preferably formed at the upper end of passage 33, so that when the piston valve 27 is seated communication is shut off from chamber 22 to the free discharge.

The chamber 35 on the lower side of the piston 31 is adapted to be supplied with pipe line fluid through a pipe connection 36.

Chamber 37 on the upper side of the piston 31 is also supplied with pipe line fluid from the pipe 36, through a branch pipe 38 having a valve 39 installed therein.

Preferably valve 39 is of the needle or other suitable form of valve adapted to provide an adjustable restricted orifice for regulating the rate at which fluid is admitted to the chamber 37 on the upper side of the piston 31.

As shown in Fig. 1, the connection or pipe 36 may be connected to the pipe line 12, preferably on the down-stream side of the check valve 11.

Associated with the relief valve 14, is an exhaust valve device 41, comprising a valve body having an upper or pressure chamber 42 connected to the piston chamber 37 of the relief valve 14 by a pipe 43, and a lower or exhaust chamber 44 connected to a free discharge or sewer by a pipe 45.

The chambers 42 and 44 are separated by a wall having a passage formed therein defining a valve seat 46 for a valve 47 disposed in chamber 44.

Extending upwardly from the valve 47 is a stem 48 which is fixed to a flexible diaphragm device 49.

The diaphragm 49 has one side subject to the pressure of a coil spring 50 encircling the valve stem 48 and bearing at one end against the lower face of said diaphragm and bearing at the other end against a shoulder 51 formed in the housing of the exhaust valve device 41.

The side of the diaphragm 49 opposite to the spring pressed side thereof is subject to the pressure of fluid in a chamber 52.

Leading from chamber 52 is a pipe 53 which may be connected to a sewer or free discharge.

Installed in the pipe 53 is a valve 54. Preferably the valve 54 is of the needle or other suitable form of valve adapted to provide an adjustable restricted orifice for regulating the rate at which fluid is exhausted from chamber 52 to the free discharge or sewer.

Fluid under pressure is adapted to be supplied to chamber 52 of the exhaust valve device 41 from an admission valve device 56, through a pipe 55.

Normally spring 50 retains the valve 47 seated against its seat 46, and said valve will remain seated as long as the pressure of fluid in chamber 52 does not exceed the pressure of spring 50.

The admission valve device 56 has an upper chamber 57 which is always in communication with the diaphragm chamber 52, through pipe 55, and a lower or pressure chamber 58 which is connected to a source of supply of fluid under pressure by a pipe 59.

The chambers 57 and 58 are separated by a wall having a passage formed therein defining a valve seat 60 for a valve 61 disposed in chamber 58.

The valve 61 has a stem 62 which extends outwardly of the casing of the admission valve device 56, the extremity of said valve stem being connected to one end of a lever 63.

The lever 63 is pivotally connected intermediate its length by a pin 64, to a bracket 65 so that said lever can be rocked or swung to move the valve 61 away from or towards its seat 60.

The other end of lever 63 is pivotally connected, as at 66, to a stem projecting from one end of a flexible connector device 67.

The flexible connector device 67 constitutes a collapsible or telescoping link between an end of lever 63 and the end of another lever 68.

The flexible connector device comprises a cylinder having one end portion pivotally connected by pin 66 to the end of lever 63. Mounted within the cylinder of the flexible connector device 67 is the headed end 69 of a rod or link 70 which extends through an opening formed in the end of the cylinder and has its extremity connected to the end of lever 68 by a pivot pin 71.

Disposed within the cylindrical body of the flexible connector device 67, is a coil spring 72, one end of which bears against an abutment provided by end wall 73 of the cylinder and the other end of which bears against the head 69 of the rod 70.

Normally the spring 72 is extended and retains the head 69 against the abutment provided by end wall 74 of the cylinder 67.

During operation of the device, after lever 68 has actuated lever 63 an amount to unseat valve 61, should the lever 68 continue to move after the valve 61 has been actuated its maximum amount, the rod or link 70 will compress spring 72 and in doing so the operating forces of lever 68 will not be transmitted to lever 63, since the driving connection between lever 63 and lever 68 will telescope, as will be understood.

Fixed to the valve plug shaft 17 is a crank 76, to the outer end of which is pivotally connected by a pin 77, the upper end of the piston rod 78 of a dash pot device 79.

The dash pot device 79 comprises a casing or housing 80 which is secured to cover plate 81 of the check valve 11, said casing 80 constituting a guide for the dash pot cylinder 82 which is slidably mounted therein in the manner shown best in Fig. 2.

An elongated slot 83 is formed in the wall of the housing 80, as shown in Fig. 1.

Lever 68 is pivotally mounted intermediate its length by a pin 84 carried by a bracket 85.

The end of the lever 68 opposite to the end having the pivot pin 71, is pivotally connected to the dash pot cylinder 82, by a pin 86, the construction and arrangement of the parts being such that rectilinear movements of the dash pot cylinder 82 effect swinging movements of the lever 68 about the fulcrum provided by the pivot 84, and these swinging movements of lever 68 actuate the valve operating lever 63 of the admission valve device 56 through the flexible connector 67.

The dash pot cylinder 82 is freely movable rectilinearly within the guide 80, the upper rectilinear movement of said cylinder being limited by the stop provided by a shoulder 87 formed at the upper end of the guide 80, against which shoulder the upper end of the dash pot cylinder 82 abuts when the device is inactive, as shown in Fig. 2. Thus, when valve 61 is seated and spring 72 forces the head 69 into contact with abutment 74, the rod or link 70 and lever 68 will dispose the dash pot cylinder 82 in its guide 80 so that the upper end of said cylinder 82 engages shoulder 87.

Mounted within the cylinder 82 is a piston 88 which is fastened to the lower end of the piston rod 78.

The cylinder 82 contains a suitable quantity of fluid for controlling the movement of the piston 88 therein in well known manner.

Preferably the dash pot device should be of the type known as a differential dash pot. In such type of dash pot device, the piston 88 is formed with a restricted orifice 89 through which the fluid within the cylinder 82 is by-passed at a predetermined rate. Also formed in the piston 88 is a second orifice 90 the flow of fluid through which is controlled by a spring actuated valve 91 mounted in the piston in such a manner that, during movement of the piston in one direction within the cylinder, the valve remains seated, and during movement of the piston within the cylinder in the opposite direction, the valve 91 is unseated so that fluid can flow through the second orifice 90. Usually orifice 90 has a larger area than the area of restricted orifice 89, so that when the valve 91 is unseated a considerable amount of fluid will by-pass the dash pot piston.

Mounted in chamber 92 on the upper side of piston 88 and encircling the piston rod 78, is a coil spring 93.

The construction of piston 88 and the arrangement of the valve 91 is such that, when the piston is moved downwardly, the valve 91 is retained in position to cut off communication through the orifice 90, and since the fluid can only pass through the small opening or orifice 89, the downward movement of the piston is retarded.

Since the orifice 89 restricts the flow of fluid in the dash pot from one side of the piston 88 to the other side of said piston, when said piston is actuated rapidly the fluid cannot flow through the orifice 89 in a sufficient volume or quantity to displace the piston and consequently the piston is held by the fluid in its relative position in the cylinder 82. Thus, since the piston 88 is immovable with respect to the cylinder 82, the cylinder 82 is also moved in the same direction with the piston.

On the other hand, when the piston 88 is actuated at a predetermined slow rate of speed, the fluid within the dash pot cylinder 82 can pass through the orifice 89, and in doing so the piston 88 will move within the cylinder without affecting the position of the cylinder 82 in its guide 80.

Thus, summarizing the operation of the dash pot device 79, it will be noted that when forces are applied to move the piston 88 with rapidity the cylinder 82 will also be moved, but when the actuating forces applied to the piston 88 move at a predetermined slow rate of speed, the piston 88 will move within the dash pot cylinder 82 without affecting the relative position of said cylinder.

In operation, when the check valve plug 15 is turned at a predetermined normal or slow rate of speed in the direction of the arrows, Figs. 1 and 2, from open to closed position, which rotative movement of said plug is through an angle of approximately 90 degrees, the crank or arm 76 on the end of the plug shaft 17 will also be turned through a corresponding angle, and during such movement, the piston 88 of the dash pot will be forced by its rod 78 downwardly within the cylinder 82, and this downward piston movement within cylinder 82 is slow, the fluid in the chamber 94 on the lower side of said piston will pass through the restricted orifice 89 in the piston to the chamber 92 on the upper side of said piston in well known manner, so that the cylinder 82 will not be displaced from its position in the guide 80 against shoulder 87. Consequently, lever 68 will not be operated and the relief valve 27 will remain seated against seat 30.

Thus, any time the valve plug 15 is moved from open towards closed position at its normal or slow turning rate of speed, the relief valve 14 will remain inactive.

On the other hand, when the valve plug 15 is actuated and turned from open position shown in Figs. 1 and 2, towards closed position at a fast rate of speed, as has heretofore been referred to, the dash pot piston 88 is actuated in such a manner that, due to the resistance of the fluid within the cylinder 82 the piston 88 forces the cylinder 82 downwardly within its guide 80.

Thus, when the cylinder 82 is moved downwardly in its guide 80 through the operation of the dash pot piston 88 in the above referred to rapid manner, lever 68 is swung by cylinder 82 about the fulcrum provided by pivot 84, and this action is transmitted to lever 63, by the flexible connector 67, so that valve 61 is unseated from seat 60.

The instant valve 61 is unseated, fluid under pressure is supplied through pipe 55 to diaphragm chamber 52. The pressure of the fluid thus supplied to chamber 52, acting on the diaphragm 49, causes the exhaust valve 47 to move away from its seat 46, against the pressure of spring 50, thereby connecting chamber 42 with chamber 44.

Fluid under pressure in piston chamber 37 is vented to the sewer through pipe 43, chambers 42, 44 and pipe 45. The pressure of the fluid supplied to piston chamber 35 from pipe 36, acting on the bottom of piston 31, causes the piston valve 27 to move rapidly upwardly away from the seat 30, thereby connecting chamber 22 with the free discharge provided by passage 33. The upward movement of the piston valve 27 away from seat 30 results in a quick discharge of fluid under pressure from the pipe 12, through vent pipe 13, passage 23, chamber 22, and passage 33, so that the pressure of the fluid in the pipe 12 is quickly reduced.

When the piston valve 27 has completed its upward movement in the manner above described, fluid within dash pot cylinder 82 is gradually by-passed through the orifice 89 in piston 88 by the force of spring 93 tending to extend the distance between the end 95 of the dash pot cylinder 82 and piston 88. Thus, the cylinder 82 is moved within the guide 80 and with respect to the piston 88 until the end 95 of said cylinder abuts shoulder 87. In this position of the cylinder 82, lever 68 is restored to its original position, in which position valve 61 is seated, thereby closing the admission valve device 56. As soon as valve 61 engages seat 60, the supply of fluid under pressure to diaphragm chamber 52 is cut off. The fluid under pressure in the diaphragm chamber 52 is then discharged through bleeder pipe 53, allowing exhaust valve 47 to close.

With the valve 47 thus closed, pressure of fluid in piston chamber 37 builds up at a rate determined by the setting of valve 39 in pipe 38. In actual practice the rate at which the fluid is supplied to piston chamber 37 is relatively slow so that the piston valve will be moved down towards the seat 30 very slowly, thereby gradually closing the communication from the pipe 12 to the free discharge provided by passage 33.

While we have described the invention in great detail and with respect to the present preferred form thereof, it is not desired to be limited thereto since changes and modifications may be made therein without departing from the spirit and scope of the invention. The invention may be embodied in other specific forms without departing from the essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

Having thus described our invention, what we claim is:

1. The combination with a main pipe line having a check valve therein for automatically controlling the flow of fluid therethrough, said check valve having a rotatable gate, a relief valve device connected to the main pipe and having a discharge port and a valve for controlling communication through said discharge port, said relief valve normally closing said discharge port when the check valve gate is in open position, said relief valve being arranged to retain the discharge port closed when said valve gate is operated from open towards closed position at a predetermined rate, an operating piston attached to said relief valve, said piston having differential areas so that the relief valve is normally held closed by pressure acting on its larger area, an exhaust valve device for controlling the operation of said relief valve piston, said exhaust valve device having a chamber connected to the piston chamber of larger area and a normally closed pressure operated valve arranged to be operated to open position by a predetermined increase in fluid pressure for establishing communication from said exhaust valve devise chamber to a free discharge whereby operating fluid in said piston chamber of larger area is discharged to the free discharge of said exhaust valve device so as to effect operation of said relief valve to establish communication from the main pipe through said discharge port and thereby exhaust fluid under pressure from said main pipe, an admission valve device having a fluid chamber connected to said exhaust valve device by which fluid is supplied to operate the exhaust valve, a valve for admitting fluid under pressure from a source of fluid supply to said admission valve device fluid chamber, means for operating said admission valve including a dash pot device having a fixed guide, a dash pot cylinder mounted for rectilinear movements in said guide, a piston mounted within said dash pot cylinder, means for controlling the operation of the piston within said dash pot cylinder whereby said cylinder is moved by said piston and whereby said piston is moved relatively with respect to said cylinder, means operatively connecting said dash pot cylinder to said admission valve for operating said admission valve when said dash pot cylinder moves rectilinearly in its guide, and means operatively connecting said dash pot piston to said check valve gate, said dash pot device being so constructed and arranged that movement of the check valve gate toward closed position at greater than the predetermined rate effects movement of the dash pot cylinder and that movements of the check valve gate toward closed position at less than the pedetermined rate effect movement of the dash pot piston relative to said dash pot cylinder.

2. The combination with a main pipe line hav-

-ing a check valve therein for automatically controlling the flow of fluid therethrough, said check valve having a rotatable gate, a relief valve device connected to the main pipe and having a discharge port and a valve for controlling communication through said discharge port, said relief valve normally closing said discharge port when the check valve gate is in open position, said relief valve being arranged to retain the discharge port closed when said valve gate is operated from open towards closed position at a predetermined rate, an operating piston attached to said relief valve, said piston having differential areas so that the relief valve is normally held closed by pressure acting on its larger area, an exhaust valve device for controlling the operation of said relief valve piston, said exhaust valve device having a chamber connected to the piston chamber of larger area and a normally closed pressure operated valve arranged to be operated to open position by a predetermined increase in fluid pressure for establishing communication from said exhaust valve device chamber to a free discharge whereby operating fluid in said piston chamber of larger area is discharged to the free discharge of said exhaust valve device so as to effect operation of said relief valve to establish communication from the main pipe through said discharge port and thereby exhaust fluid under pressure from said main pipe, an admission valve device having a fluid chamber connected to said exhaust valve device by which fluid is supplied to operate the exhaust valve, a valve for admitting fluid under pressure from a source of fluid supply to said admission valve device fluid chamber, leverage mechanism for operating said admission valve and including a telescoping flexible connector, a dash pot device having a fixed guide, a dash pot cylinder mounted for rectilinear movements in said guide, a piston mounted within said dash pot cylinder, means for controlling the operation of the piston within said dash pot cylinder whereby said cylinder is moved by said piston and whereby said piston is moved relatively with respect to said cylinder, a lever having one of its ends connected to said dash pot cylinder and actuated thereby, the other end of said lever being connected to the flexible connector of said admission valve leverage mechanism, and means operatively connecting said dash pot piston to said check valve gate, said dash pot device being constructed and arranged to be normally inoperative on closing of said check valve gate at less than the predetermined rate and being arranged to operate said admission valve to open position on closing of said check valve at a rate greater than the predetermined rate.

3. In a control system of the type described, the combination with a main pipe having a check valve therein for automatically controlling the flow of fluid therethrough, said check valve having a rotatable plug, of a relief valve connected to the main pipe and having a discharge port and a valve for controlling communication through said discharge port, said relief valve normally closing the discharge port when the check valve plug is in open position and being arranged to retain the discharge port closed when the check valve plug is operated at a predetermined rate, an operating piston attached to said relief valve, said piston having differential areas so that the relief valve is normally held closed by pressure acting on its larger area, an exhaust valve device for controlling the operation of said piston, said exhaust valve device having a chamber connected to the piston chamber of larger area and a diaphragm operated valve arranged to be operated to open position by a predetermined increase in fluid pressure supplied to a chamber on one side of said diaphragm for establishing communication from said exhaust valve device chamber to a free discharge whereby operating fluid in said pitson chamber of larger area is discharged through the free discharge of said exhaust valve device so as to effect operation of said relief valve to establish communication from the main pipe through said discharge port and thereby exhaust fluid under pressure from said main pipe, an admission valve device having a valve for controlling the supply of fluid under pressure to operate the diaphragm of said exhaust valve device, a dash pot device for controlling the operation of said admission valve, said dash pot device having a cylinder rectilinearly movable in a stationary guide, means operatively connecting said dash pot cylinder with the valve of said admission valve device, a piston arranged within said dash pot cylinder and connected to said main valve plug, and means for controlling the operation of the dash pot whereby said cylinder is moved by said piston and whereby said piston is moved relatively with respect to said cylinder, said dash pot device being so constructed and arranged that movement of the check valve toward closed position at greater than the predetermined rate effects movement of the dash pot cylinder to thereby open said admission valve, whereby operation of said relief valve piston is initiated through said admission valve and said exhaust valve device, and that movement of the check valve toward closed position at less than the predetermined rate effects movement of said dash pot piston within said dash pot cylinder without imparting rectilinear movement to said dash pot cylinder within its guide.

4. The combination with a main pipe and a check valve therein having an automatically operated gate for controlling the flow of fluid therethrough, of a relief valve connected to the main pipe and having a discharge port and a valve for controlling communication through said discharge port, said relief valve normally closing said discharge port when the check valve gate is in open position and being arranged to retain the discharge port closed when the check valve gate is operated from open towards closed position at a predetermined rate, an operating piston attached to said relief valve, said piston having differential areas so that the relief valve is normally held closed by pressure acting on its larger area, said piston being arranged to open said relief valve upon a predetermined decrease in pressure in said chamber of larger area, an exhaust valve device for controlling the operation of said relief valve piston, said exhaust valve device having a chamber connected to the relief valve piston chamber of larger area, said exhaust valve device having a diaphragm operated valve arranged to be operated by a predetermined increase in fluid pressure supplied to a chamber on one side of said diaphragm for establishing communication from said exhaust valve device chamber to a free discharge whereby fluid in said piston chamber of larger area is discharged to the free discharge of said exhaust valve device, an admission valve device having a valve for controlling the supply of fluid under pressure to operate the diaphragm of said exhaust valve device, leverage mechanism for operating said admission valve, a dash pot device having a fixed guide, a dash pot cylinder mounted for rectilinear movements in said guide, a piston mounted within said dash pot cylinder and operatively connected to said check valve gate, means for controlling the operation of the piston within said dash pot cylinder whereby said cylinder is moved by said piston and whereby said piston is moved relatively with respect to said cylinder, and means operatively connecting said dash pot cylinder to said leverage mechanism for operating said admission valve when said dash pot cylinder moves rectilinearly in its guide, said dash pot device being so constructed and arranged that movement of the check valve gate toward closed position at greater than the predetermined rate effects movement of the dash pot cylinder and that movements of the check valve gate toward closed position at less than the predetermined rate effect movement of the dash pot piston relative to said dash pot cylinder.

5. The combination with a main pipe line having a main valve therein, said main valve having a plug for controlling the flow of fluid therethrough, of a relief valve connected to the main pipe and having a discharge port and a valve for controlling communication through said discharge port, said relief valve normally closing said discharge port when the check valve plug is in open position and being arranged to retain the discharge port closed when the check valve plug is operated from open towards closed position at a predetermined rate, an operating piston attached to said relief valve, said piston having differential areas so that the relief valve is normally held closed by pressure acting on its larger area, said piston being arranged to open said relief valve upon a predetermined decrease in pressure in said chamber of larger area, an exhaust valve device for controlling the operating fluid in said piston chamber of larger area, said exhaust valve device having a diaphragm operated valve operated to open position by fluid under pressure, an admission valve device for controlling the supply of fluid under pressure to operate the diaphragm of said exhaust valve device, a dash pot device for controlling the operation of said admission valve, said dash pot device having a cylinder rectilinearly movable in a guide fastened to said main valve, a leverage mechanism operatively connecting said dash pot cylinder with the valve of said admission valve device, and a piston arranged within said dash pot cylinder and connected to said main valve plug, said dash pot piston being so constructed and arranged as to be movable within said dash pot cylinder when the main valve plug is operated at a predetermined rate without imparting rectilinear movement to said dash pot cylinder within its guide, and so that when moved at a rate greater than the predetermined rate on closing of said check valve plug at a rate greater than a predetermined rate, to impart rectilinear movement to said dash pot cylinder to thereby open said admission valve, whereby operation of said relief valve piston is initiated through said admission valve and said exhaust valve device.

BURWELL B. SMITH.
EARL E. HILKER.